(12) United States Patent
Lin et al.

(10) Patent No.: US 6,294,853 B1
(45) Date of Patent: Sep. 25, 2001

(54) COOLING OF ELECTROMECHANICAL ACTUATOR WITH PHASE CHANGE MATERIAL AND THERMOSYPHONS CONTAINING WORKING FLUID

(75) Inventors: Lanchao Lin, Beavercreek; John E. Leland, Kettering; Rengasamy Ponnappan, Dayton, all of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/704,947

(22) Filed: Nov. 2, 2000

Related U.S. Application Data
(60) Provisional application No. 60/222,589, filed on Aug. 2, 2000.

(51) Int. Cl.[7] ............................. H02K 9/00; H02K 9/19
(52) U.S. Cl. ................................. 310/57; 310/52
(58) Field of Search ................... 310/54, 64, 57, 310/52, 11, 262; H02K 9/00, 3/46, 5/18, 5/20, 9/19

(56) References Cited

U.S. PATENT DOCUMENTS

| | | | |
|---|---|---|---|
| 4,063,122 | * 12/1977 | Kullmann | 310/64 |
| 4,358,937 | * 11/1982 | Okamoto | 62/505 |
| 4,797,588 | 1/1989 | Capion . | |
| 5,642,987 | * 7/1997 | Taricco | 417/53 |
| 5,770,903 | 6/1998 | Bland et al. . | |
| 5,939,808 | * 8/1999 | Adames | 310/89 |
| 5,952,748 | * 9/1999 | Boldlehner | 310/54 |

\* cited by examiner

*Primary Examiner*—Karl Tamai
(74) *Attorney, Agent, or Firm*—Richard A. Lambert; Bobby D. Scearce; Thomas L. Kundert

(57) ABSTRACT

A passively cooled electromechanical actuator is disclosed. The passively cooled electromechanical actuator includes a rotor having an output shaft rotatably received within a stator. A pair of inner supports connect the stator to a pair of mounting platforms. The mounting platforms are attached to the inner surfaces of an aircraft wing and are in thermal communication therewith. A pair of closed, capillary tube thermosyphons containing a working fluid are in thermal communication with the stator, the inner supports and the mounting platforms. During operation, the thermosyphons receive heat from the stator and transport it to the mounting platforms whereupon it is convected or radiated to the atmosphere from the aircraft wings. The inner supports have a phase change material received within for providing temporary thermal energy storage during transient conditions.

9 Claims, 4 Drawing Sheets

COOLING OF ELECTROMECHANICAL ACTUATOR WITH PHASE CHANGE MATERIAL AND THERMOSYPHONS CONTAINING WORKING FLUID

The present application is related to and claims priority on prior copending Provisional Application No. 60/222,589, filed Aug. 2, 2000, entitled Passively Cooled Electromechanical Actuator.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to electrical control devices and more specifically to an electromechanical actuator including a passive cooling system.

There is a growing trend in the design of modern aircraft control systems to replace the well known control surface hydraulic actuators with localized, dedicated electromechanical actuating devices. The overall aim is to eliminate the aircraft hydraulic system in order to enhance simplicity, reduce operating costs, reduce aircraft weight and avoid loss of aircraft control situations due to hydraulic system failure. Military aircraft are perhaps especially vulnerable to hydraulic system failure from flight critical battle damage received during combat. Both military and civilian aircraft, however, would benefit from the elimination of the hydraulic control systems in favor of dedicated, individual electromechanical control devices.

As is well known, electromechanical actuators are inefficient during operation. The waste heat generation of the electromechanical actuators average 10–25% of their power, which must be removed in order to assure continuous, reliable operation. While hydraulic actuators also generate waste heat, this heat is removed by the central hydraulic system and discharged at a remote location. While it would be possible to provide a central cooling system to cool the electromechanical actuators, much of the benefit otherwise gained by the utilization of the individual electromechanical actuators would be lost because one centralized system is simply substituted for another. Moreover, the increased complexity of such a central cooling system including the attendant pumps, valves, plumbing, etc. serves to eliminate this as a choice of a viable, alternative system.

One recent approach to providing a self cooling electromechanical device is found in U.S. Pat. No. 5,770,903 to Bland et al. disclosing a reflux-cooled electromechanical device including a housing surrounding the stator defining a sealed boiling chamber. The boiling chamber contains a fluid for transferring heat and a condenser for removing the heat externally from the boiling chamber. While this device does provide a degree of heat transfer from the electromechanical actuator, a need for improvement exists. More specifically, because of the boiling chamber design, the heat transfer characteristics of this device change dramatically with changes in G loading forces as would be encountered by modern military aircraft in flight.

A need exists therefore for an improved self cooled electromechanical actuator Such a device would be capable of providing independent, reliable operation in a range of operating conditions from <<1 G to 10 G.

SUMMARY OF THE INVENTION

Accordingly, it is a primary object of the present invention to provide an improved, passively cooled electromechanical actuator overcoming the limitations and disadvantages of the prior art.

Another object of the present invention is to provide a passively cooled electromechanical actuator that is self contained and capable of operation in a range of G loading conditions from <<1 G to 10 G.

Yet another object of the present invention is to provide a passively cooled electromechanical actuator having a sealed cooling system requiring no coolant replenishment.

Still another object of the present invention is to provide a passively cooled electromechanical actuator that includes a thermally activated phase change material for absorbing or releasing heat during transient high heat flux operating conditions.

Additional objects, advantages and other novel features of the invention will be set forth, in part, in the description that follows and will, in part, become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects and in accordance with the purposes of the present invention as described herein, a passively cooled electromechanical actuator incorporates sealed thermosyphons to provide effective, passive cooling of the actuator during operation.

The preferred embodiment of the passively cooled electromechanical actuator selected to illustrate the invention includes a pair of closed thermosyphons in thermal communication with the stator. The thermosyphons receive heat from the stator and transmit it to a pair of mounting platforms to direct the heat away from the actuator. For aircraft applications, the mounting platforms are attached to the inner surfaces of the wings, so as to direct the heat into the atmosphere, away from the aircraft.

According to an important aspect of the present invention, the passively cooled electromechanical actuator includes a pair of inner supports in thermal communication with the actuator stator. Received within each support is a quantity of phase change material. This phase change material, normally solid, has a melting temperature just above the expected range of operating temperatures encountered by the passively cooled electromechanical actuator during normal aircraft operation. During transient conditions, when a greater than normal heat flux is encountered either internally by actuator operation or externally by aircraft high mach dashes, the phase change material melts, and in so doing, temporarily absorbs this additional heat. The thermosyphons, being in thermal communication with the phase change material, will remove this additional, stored heat when operating conditions return to normal. The phase change material will re-solidify in readiness for the next transient cycle.

Accordingly, the passively cooled electromechanical actuator of the present invention can also effectively operate in unexpected, high heat flux transient conditions both internal and external, assuring reliable, independent operation over a wide range of aircraft operating conditions.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
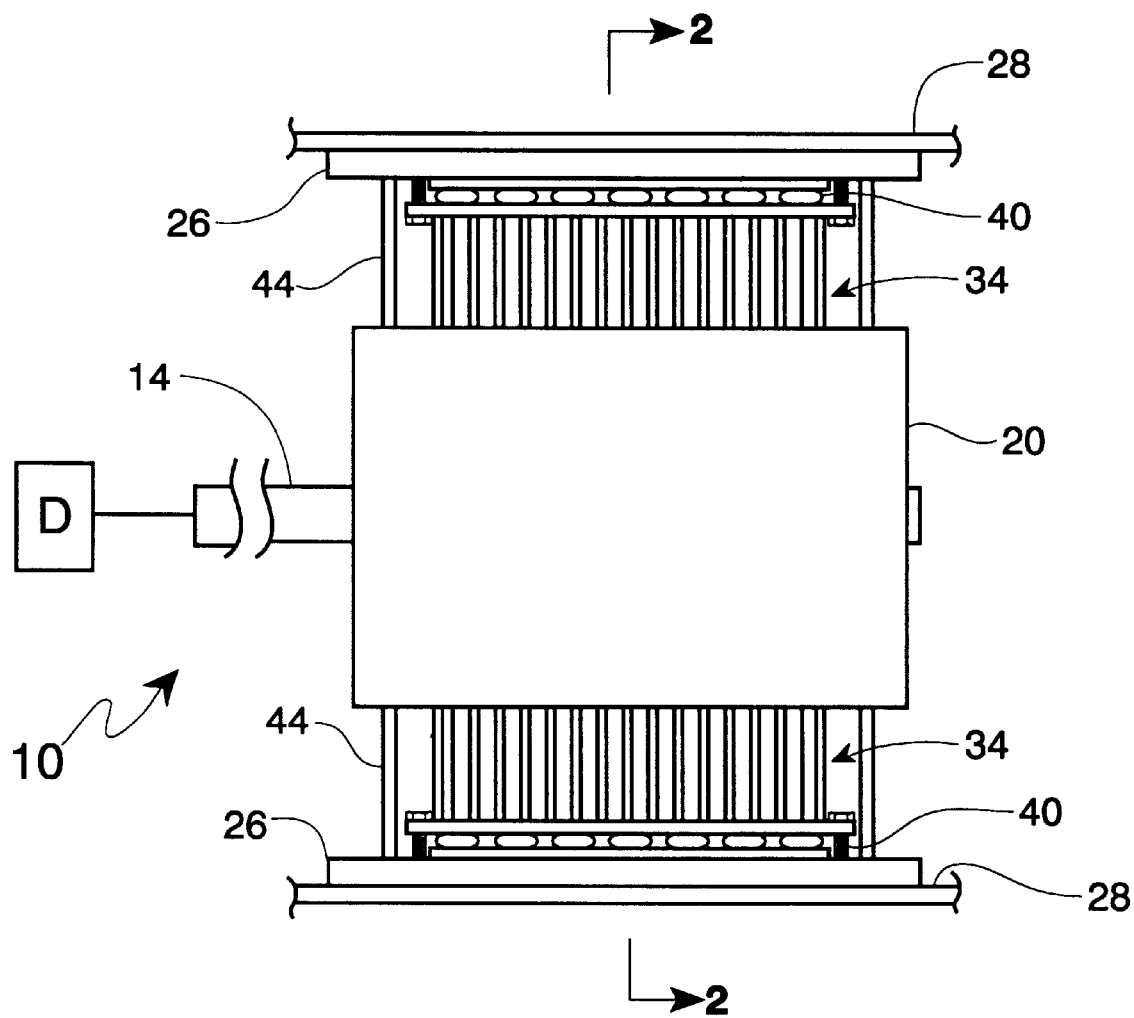
FIG. 1 is an elevational view of the passively cooled electromechanical actuator of the present invention.
Figure 4:
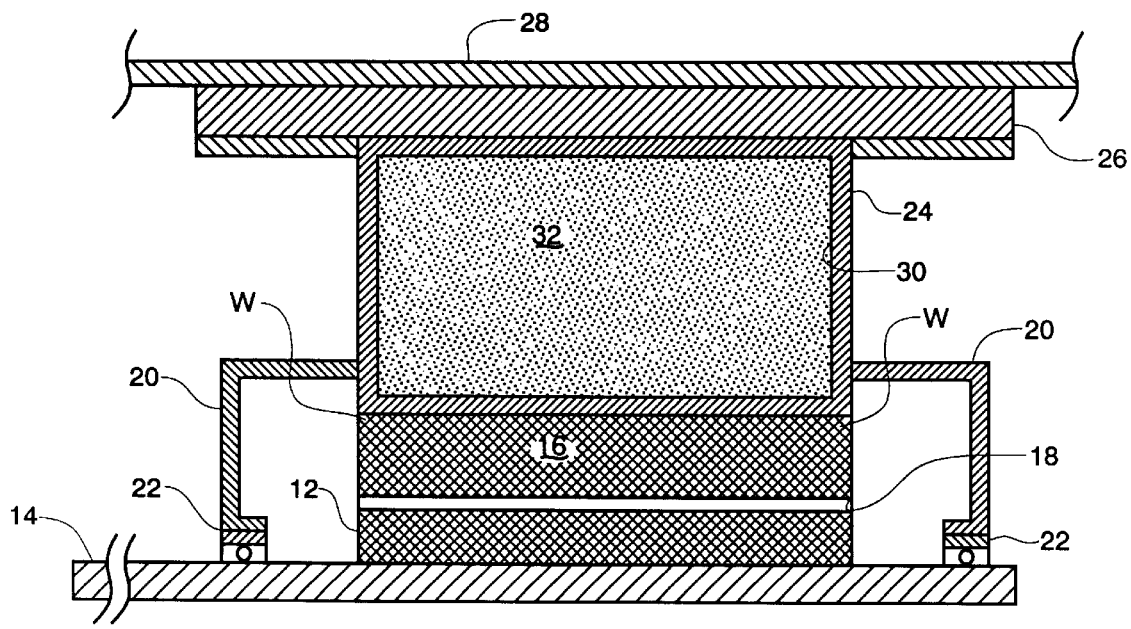
FIG. 4 is a sectional view taken along section lines 4—4 of FIG. 2.

Reference is made to FIGS. 1, and 4, showing the passively cooled electromechanical actuator 10 of the present invention. The actuator 10 includes a rotatable rotor 12 including an output shaft 14. The output shaft 14 is connected to a driven component D which, in aeronautical applications, can be an aircraft control surface. As is known in the art, the rotor is rotatably mounted within a stationary stator 16. An airgap 18 separates the rotor 12 from the stator 16. The stator 16 includes electrical windings generally designated W. The windings W, when energized by applied electrical power, exert an electromagnetic force upon the rotor 12, thereby exerting the desired motive force upon the output shaft 14.

Figure 2:
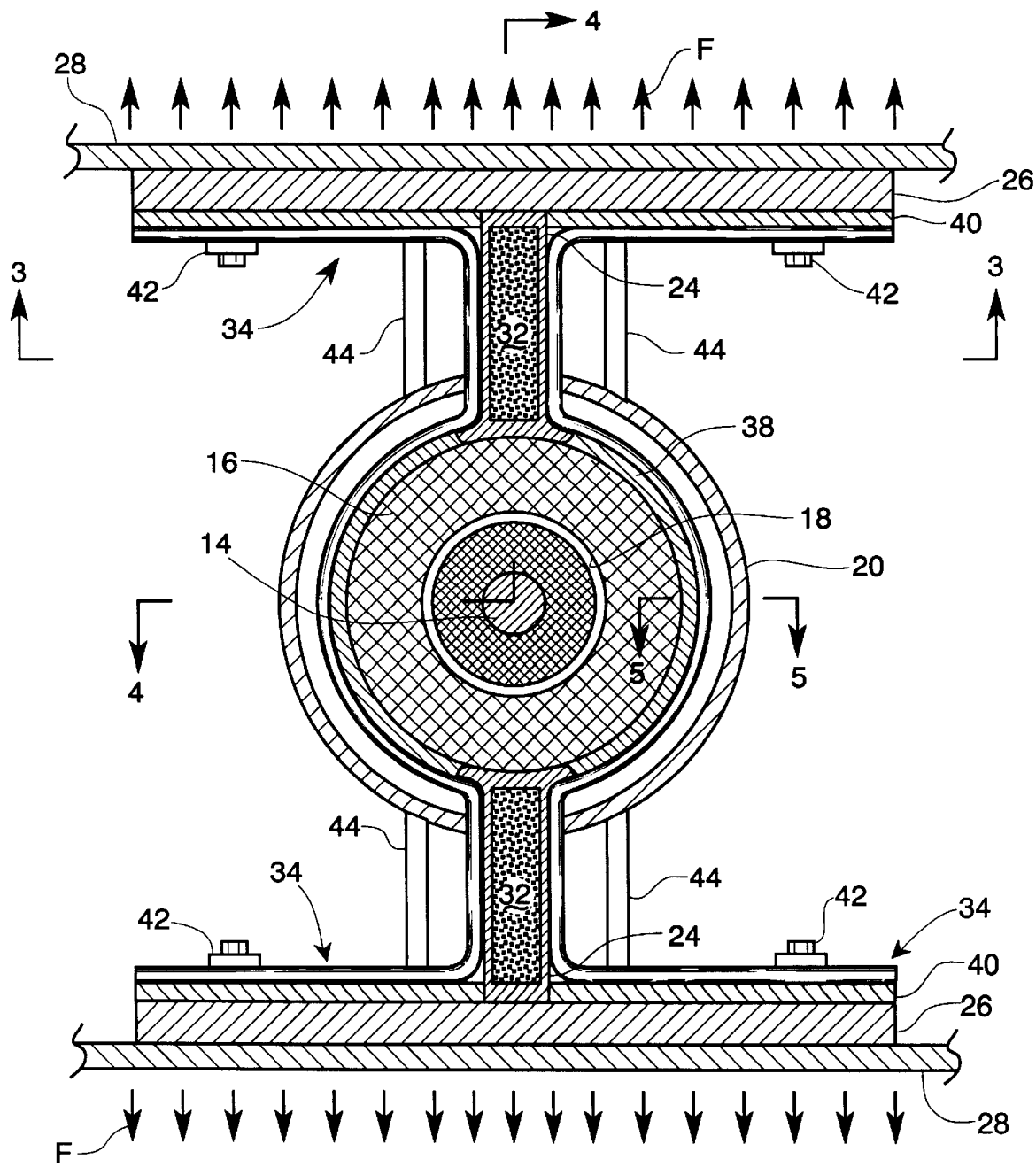
FIG. 2 is a sectional view taken along section lines 2—2 of FIG. 1.

The stator 16 and the rotor 12 are both mounted within a housing 20. Bearings 22 are provided within the housing 20 to enable output shaft 14 rotary motion. As shown in FIGS. 2 and 4, a pair of inner supports 24 are attached to the stator 16. The distal ends of the inner supports 24 extend through the housing 20 and are connected to a pair of mounting platforms 26. The mounting platforms 26 are attached to the inner surface of the aircraft wing 28 and are thermally conductive to enable effective heat transfer via convection and radiation, generally designated F, to the atmosphere.

Advantageously, the inner supports 24 include a recess 30 for retaining a quantity of phase change material 32. This phase change material 32, normally solid, has a melting temperature just above the expected range of operating temperatures encountered by the actuator 10 during normal aircraft operation. During transient conditions, when greater than normal heat flux is encountered either internally by actuator operation or externally by aircraft high mach dashes, the phase change material 32 melts, and in so doing, temporarily absorbs this additional heat. As will be described in more detail below, this additional heat is subsequently removed from the phase change material 32 as operating conditions return to normal. The phase change material 32 then re-solidifies in readiness for the next transient cycle. This dramatically improves the longevity and reliability of the actuator 10 by avoiding overheat conditions of the stator 16. Representative materials for this phase change material 32 include, but are not considered limited to, acetamide or other alkyl hydrocarbons.

Figure 3:
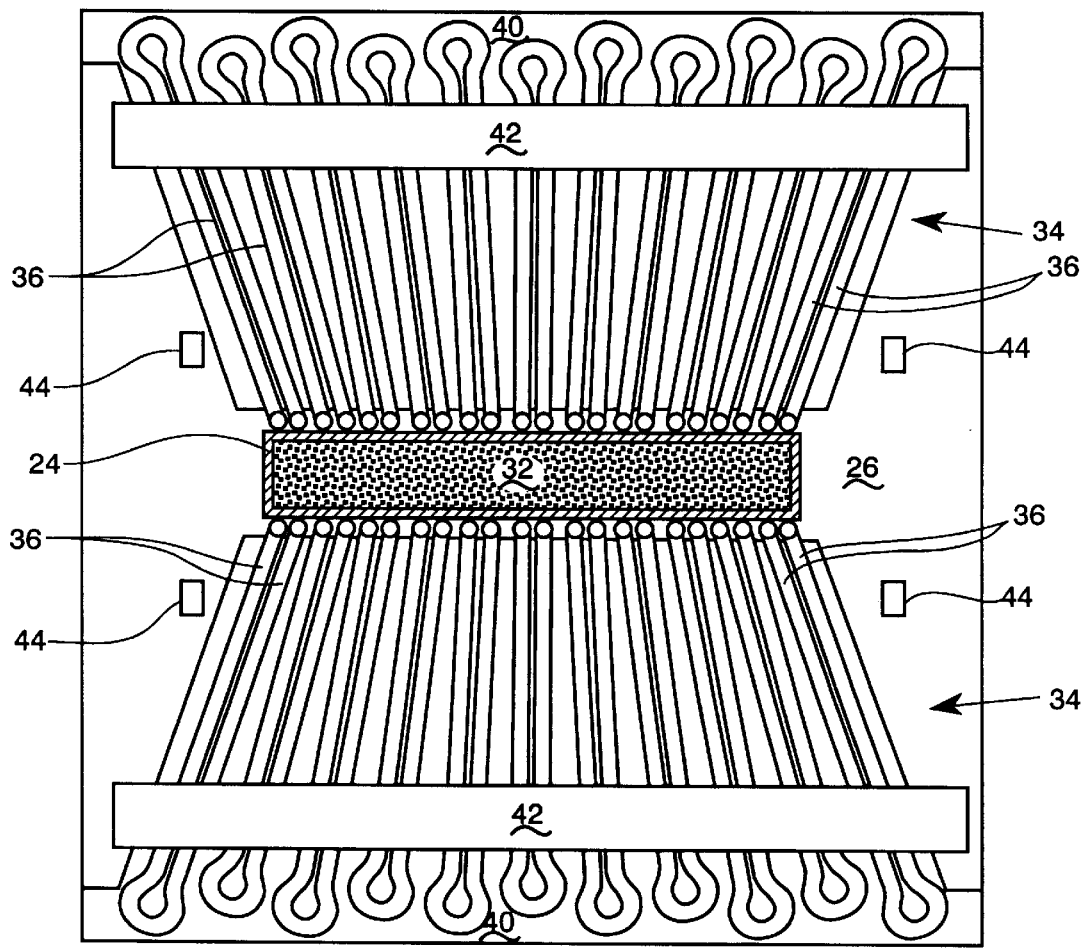
FIG. 3 is a sectional view taken along section lines 3—3 of FIG. 2.

According to an important aspect of the present invention, the actuator 10 includes a closed thermosyphon 34 to provide the desired passive cooling capability. In the preferred embodiment, a pair of thermosyphons 34 are used, as shown, for example in FIG. 2. The thermosyphons 34, include a plurality of serpentine capillary tubes 36 arranged in a looped manner, as shown in FIG. 3, for example. The thermosyphons 34 are shaped so as to be in thermal communication with the stator 16, the inner supports 24, and the mounting platforms 26. The thermosyphons 34 include a working fluid, not shown, for effecting heat transfer. After the working fluid is introduced into the thermosyphons 34, they are pinched and welded closed, providing a sealed structure never requiring fluid replenishment.

In the preferred embodiment, the working fluid is FC-72, a non-flammable refrigerant ideal for use in aircraft applications requiring non-flammability as a requirement. FC-72, a non-flammable refrigerant sold under the trademark Fluorinert, is available from 3M Company, St Paul, Minn. Other choices of working fluid include, but are not considered limited to, acetone and FC-75, another non-flammable refrigerant sold under the trademark Fluorinert, available from 3M Company, St Paul, Minn. The working fluid fill ratio (volume percent) varies by choice of fluid. For example, the fill ratio for FC-72 non-flammable refrigerant is 45%–50% and 30%–40% for acetone.

In the preferred embodiment, the thermosyphons 34 are fabricated from aluminum. Other choices of material may be appropriate, depending on application, as would be apparent to one skilled in the art. The thermosyphon 34 dimensions are chosen based on application. Generally, the tubes 36 have a small internal diameter in the range from about 1.0 mm to 2.0 mm. For example, in the case of FC-72 non-flammable refrigerant, the capillary tube size is about 1.0 mm and the number of tube bends is at least 40. In every application, however, the tubing bends are smooth and rounded in order to minimize internal flow resistance, as shown in FIG. 3.

Advantageously, and according to an important aspect of the present invention, the tubes 36 are sized to create a self-excited oscillating or pulsating two-phase flow when heated, to maximize transport of thermal energy. This pulsating two-phase flow is characterized by alternating slugs of working fluid separated by regions of vapor. The vapor regions tend to force movement of the slugs of fluid, effecting heat transfer. Adjacent tubes 36 will exhibit different pressures, enhancing operation across the thermosyphon 34. This pulsating operation of the two-phase flow is constantly changing as thin films in the meniscus region of the slugs of liquid vaporize when contacting heated areas of the actuator 10 and the vapor condenses into slugs of liquid in the cooler regions. It is this constant change within the thermosyphons 34 and in adjacent tubes 36 that enables the desirable, high heat flux operation of the passively cooled electromechanical actuator 10 of the present invention. During recent tests, a thermosyphon having a 446 mm total length and containing FC-72 non-flammable refrigerant as the working fluid was demonstrated to transport greater than 2 kW without dryout. Advantageously, by virtue of their pulsating operation, the thermosyphons 34 are capable of reliable, high heat flux operation in a wide variety of G loading conditions from <<1 G to 10 G. This enables the passively cooled electromechanical actuator 10 to be incorporated in all manner of aircraft including spacecraft.

It should be appreciated that during normal operation of the passively cooled electromechanical actuator 10 of the present invention, the flow of thermal energy is directed from the stator 16 (evaporator) to the mounting platforms 26 (condenser) through the aircraft wing 28 and into the atmosphere. See the heat flux arrows generally designated F as shown in FIG. 2. But, as mentioned above, during transient cycles of operation, heat may be transferred in the reverse direction (reversal of evaporator and condenser) as might be found during aircraft high mach dashes when the aircraft wings are heated above the temperature of the stator. In this transient situation, thermal energy is transferred through the thermosyphons 34 from the warmer mounting platforms 26 to the phase change material 32 within the inner supports 24. The phase change material 32 melts to absorb this additional heat until normal conditions return, whereupon it is cooled by the continued operation of the thermosyphons 34. The phase change material 32 then re-solidifies in readiness for the next transient cycle. The phase change material 32 also will react to absorb excess heat from the stator 16 during the normal mode of operation during transient stator high heat conditions as well. In this situation, the phase change material 32 reacts to increase the overall thermal capacity of the actuator 10 itself, advantageously avoiding stator 16 overheating. Thus, as can be seen, overheating of the stator 16, either from external or internal operation can be substantially avoided. This greatly enhances actuator 10 reliability as well as longevity.

Figure 5:
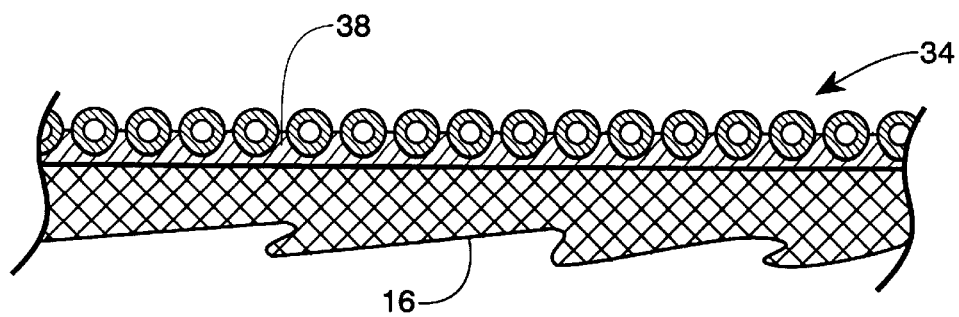
FIG. 5 is an enlarged partial sectional view taken along section lines 5—5 of FIG. 2.

Reference is now made to FIG. 5. There is an inner thermal conductor 38 interposed between the stator 16 and the thermosyphons 34. In the preferred embodiment, the thermal conductor 38 is fabricated from aluminum nitride. The choice of aluminum nitride provides the twofold benefits of achieving maximum thermal conductance as well as providing electrical impedance to block the electric current path outside of the stator 16.

As shown in FIGS. 2 and 3, the thermosyphons 34 are in thermal communication with the mounting platforms 26 through an outer thermal conductor 40. In the preferred embodiment, the outer thermal conductor 40 is fabricated from aluminum. This outer thermal conductor 40 serves as a thermal spreader between the thermosyphons 34 and the mounting platforms 26.

In order to enhance the contact thermal conductance, brackets 42 can be used to retain the thermosyphons 34 in place and to assure good thermal contact with the outer thermal conductor 40. The technique of spot welding can also be utilized, if desired, to securely attach the thermosyphons 34 to the outer thermal conductors 40.

As shown in FIGS. 1 and 2, several legs 44 are placed between the housing 20 and the mounting platforms 26. This adds additional rigidity to the structure of the passively cooled electromechanical actuator 10 without adding appreciable extra weight.

Advantageously, the passively cooled electromechanical actuator 10 can be easily modified to fit a maximum number of applications by extending the length of the thermosyphons 34 and inner supports 26 to bring the mounting platforms 26 into contact with the underside of the aircraft wings 28. This serves to maximize the overall usefulness of the actuator 10 by enabling installation into a wide variety of applications.

In summary, numerous benefits have been described from utilizing the principles of the present invention. In particular, the passively cooled electromechanical actuator 10 of the present invention includes a pair of thermosyphons 34 in thermal communication with the stator 16 to provide effective cooling. The actuator 10 also includes a quantity of phase change material to absorb heat during transient conditions.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

We claim:

1. A passively cooled electromechanical actuator, comprising:

a rotatable rotor including an output shaft;

a stator disposed around said rotor;

a housing containing said rotor and said stator;

a pair of inner supports, each said inner support having a proximal end contacting said stator and a distal end;

a pair of mounting platforms, each one of said mounting platforms contacting one of said distal ends of one of said inner supports;

at least one capillary tube thermosyphon having a plurality of serpentine tubes in thermal communication with said stator, said inner supports and said mounting platforms;

a quantity of phase change material received within each of said inner supports;

an inner thermal conductor disposed between said stator and said thermosyphons; and, a working fluid received within said thermosyphons.

2. The electromechanical actuator of claim 1 further including a pair of outer thermal conductors, each one of said outer thermal conductors being disposed between said thermosyphons and one of said mounting platforms.

3. The electromechanical actuator of claim 1 wherein said phase change material is from the group of acetamide and alkyl hydrocarbons.

4. The electromechanical actuator of claim 3 wherein said phase change material is acetamide.

5. The electromechanical actuator of claim 1 wherein said tubes have a diameter of about 1.0 mm to about 2.0 mm.

6. The electromechanical actuator of claim 1 wherein said thermosyphons are fabricated from aluminum.

7. The electromechanical actuator of claim 1 further including a multiplicity of legs connecting said housing and said mounting platforms.

8. The electromechanical actuator of claim 1 wherein said inner thermal conductor is aluminum nitride.

9. The electromechanical actuator of claim 2 wherein said outer thermal conductors are fabricated from aluminum.

* * * * *